US010440334B2

(12) United States Patent
Ziarati

(10) Patent No.: US 10,440,334 B2
(45) Date of Patent: *Oct. 8, 2019

(54) MRI COMPATIBLE PROJECTOR WITH BUILT-IN SAFETY FEATURES

(71) Applicant: Resonance Technology, Inc., Northridge, CA (US)

(72) Inventor: Mokhtar Ziarati, North Hollywood, CA (US)

(73) Assignee: Resonance Technology, Inc., Northridge, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/956,615

(22) Filed: Apr. 18, 2018

(65) Prior Publication Data

US 2018/0241976 A1    Aug. 23, 2018

Related U.S. Application Data

(63) Continuation of application No. 15/642,232, filed on Jul. 5, 2017, now Pat. No. 9,979,938.

(60) Provisional application No. 62/425,809, filed on Nov. 23, 2016.

(51) Int. Cl.
*H04N 9/31* (2006.01)

(52) U.S. Cl.
CPC ......... *H04N 9/3144* (2013.01); *H04N 9/3141* (2013.01); *H04N 9/3155* (2013.01); *H04N 9/3164* (2013.01)

(58) Field of Classification Search
None
See application file for complete search history.

(56) References Cited

U.S. PATENT DOCUMENTS

| 5,414,459 | A | * | 5/1995 | Bullwinkel | A61B 3/111 348/53 |
|---|---|---|---|---|---|
| 8,936,590 | B2 | * | 1/2015 | Hood | A61M 5/14276 604/891.1 |
| 2005/0012737 | A1 | * | 1/2005 | Bullwinkel | G09G 3/3406 345/212 |
| 2005/0201107 | A1 | * | 9/2005 | Seki | G03B 21/16 362/373 |
| 2007/0103647 | A1 | * | 5/2007 | Egawa | G03B 21/16 353/54 |
| 2010/0134017 | A1 | * | 6/2010 | Yatsuda | F21V 29/30 315/113 |
| 2012/0209116 | A1 | * | 8/2012 | Hossack | A61B 17/22 600/439 |
| 2013/0293852 | A1 | * | 11/2013 | Bullwinkel | G03B 21/16 353/54 |
| 2016/0101278 | A1 | * | 4/2016 | Norris | A61M 1/166 604/29 |
| 2017/0105313 | A1 | * | 4/2017 | Shedd | H05K 7/20272 |

* cited by examiner

*Primary Examiner* — Brian P Yenke
*Assistant Examiner* — Sean N. Haiem
(74) *Attorney, Agent, or Firm* — Larry K. Roberts

(57) ABSTRACT

An MRI-compatible video projector system with improved safety features, comprising a projector module, a liquid cooling system, comprising a coolant block of non-magnetic material disposed in or adjacent the housing of the projector and heat generating components, a coolant pump situated remotely from the projector, and coupled to the coolant block by coolant lines carrying liquid to and from the coolant block, and a projector power system situated remotely from the projector.

20 Claims, 12 Drawing Sheets

COOLING SYSTEM FLOWCHART

MRI COMPATIBLE PROJECTOR WITH BUILT-IN SAFETY FEATURES

CROSS-REFERENCE TO RELATED APPLICATION

This application is a continuation of U.S. application Ser. No. 15/642,232, which in turn claims the benefit of U.S. Provisional Application No. 62/425,809 filed Nov. 23, 2016, the entire contents of which applications are hereby incorporated by reference.

BACKGROUND

With advances in f MRI and the MRI technology, the demand is much higher for a reliable and MRI safe image projector to be used for both research and patient comfort inside the high magnetic field without any adverse effect on the MRI images.

Some of the applications for the present invention include interventional surgery, delivery of computer tasks inside the MRI bore for brain stimulation, functional MRI (brain research), and as well as the showing of movie or TV channels as entertainment during MRI procedures.

To use any product inside the MRI room, it has to be certified by FDA Class II. Safety is the most important issue of using any product for medical and specifically in the MRI scanner/magnet room.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
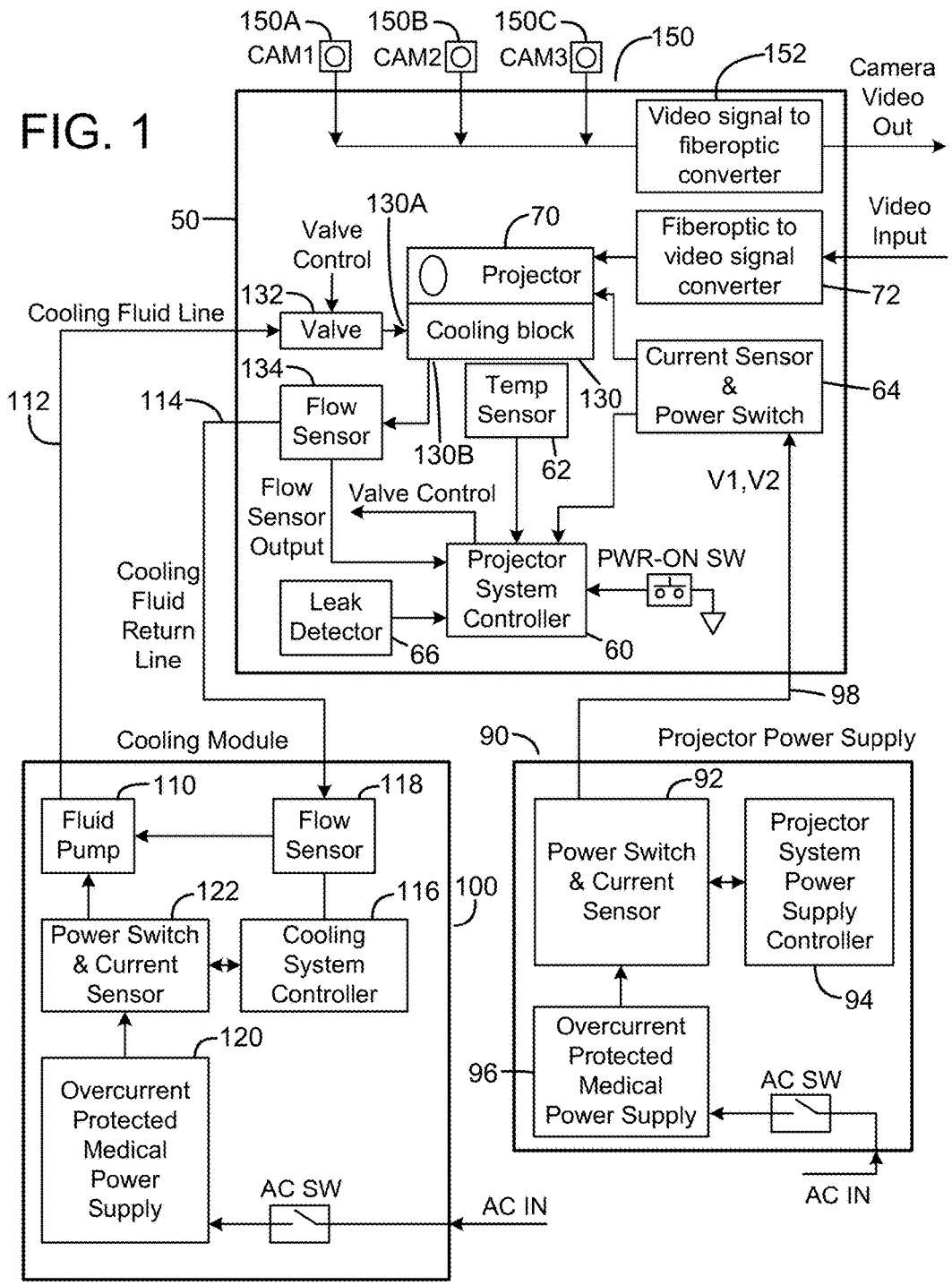
FIG. 1 is a schematic block diagram of an exemplary embodiment of an MRI-compatible projector with a separate fluid liquid system and a separate projector power supply.

In the following detailed description and in the several figures of the drawing, like elements are identified with like reference numerals. The figures are not to scale, and relative feature sizes may be exaggerated for illustrative purposes.

This invention is directed to an MRI-compatible video projector with improved safety features. The safety features include:

(i) Separate the projector power supply away from the high magnetic field of the MRI and place it in a low magnetic field area of the MRI magnet room, such as filter panel area or near the wall, or simply keep it outside of the magnet room and bring the DC power into the magnet room by passing it through a low pass filter.

(ii) Cool down the projector electronics and the projector lamp with a liquid cooling system.

(iii) Include a flow sensor in line with the liquid cooling system to detect the proper flow rate and assurance of proper cooling of the projector electronic components and the projector lamp.

(iv) Include a temperature sensor device inside the projector to assure the housing and the electronics are within a safe temperature and reduce the chance of overheating and possible fire hazard.

(vi) Omit a cooling fan operating in the high magnetic field, and instead use the liquid cooling system, to remove the induced heat generated from the LED/other type of projector lamp and the projector electronics. In conventional projectors with a cooling fan, over the long term, a cooling fan accumulated lots of dust inside the projector and the filter had to be replaced by the user. Adapting the liquid cooled projector eliminates the need of a filter and keeps inside the projector dust free, thus prolonging the projector life.

(vi) It is also possible the liquid might leak in case of a faulty liquid connection. By adding a liquid leak sensor installed in the bottom of the projector housing, the projector may give the user early warning of the liquid leak, and allow removal of the projector from the magnet room to make necessary arrangements to repair or replace the equipment.

Description of the installation and operation of the system.

An exemplary embodiment of a projector system 50, cooling system 100 and projector power supply 90 is illustrated in FIG. 1. In an exemplary embodiment, the projector power supply 90 is remoted to either outside of the magnet room or in the far corner of the magnet room away from the high magnetic field.

The cooling system 100 includes a fluid pump 110 installed either outside of the magnet room or far away from the high magnetic field. Only a pair of plastic or any type of electrically non-conductive tubing connects the projector system 50 to the pump 110 and its power supply 120, such that the pump 110 has a cooling fluid line 112 for delivering fluid to the cooling block 130 of the projector and a cooling fluid return line 114 for returning the fluid to the pump. The lines should be long enough to reach from the remotely located pump to the projector adjacent the MRI scanner. The lines could be at least 15 to 20 feet in length, or even longer.

The fluid pump 110 has a cooling system controller 116, e.g. a microcontroller, configured to stand by when turned on, and to turn the pump 110 on every few minutes, with the microcontroller checking for flow, indicating the controller 60 of the projector system 50 has turned the safety flow valve 132 to be open. If it is open, and there is fluid flow detected by the pump microcontroller 116 through flow sensor 118, then the pump 110 continues operation; otherwise the pump 110 stays in standby until the valve 132 inside the projector is open and fluid flow is detected on the periodic pump operation.

Inside the projector module 50, the projector controller 60 controls operation of the safety valve 132, which when open allows fluid to flow through to the cooling block 130, and when closed prevents fluid flow. Flow control valve 132 is normally closed until the projector module is turned on via the PWR-ON SW switch, and other conditions such as temperature, leak detection and current flow are met. High temperature can be detected by temperature sensor 62, and if it is higher than a predefined limit programmed in the projector controller, then the controller 60 of the projector system will shut the projector off by current sensor/power switch 64. Current sensor and power switch 64 supplies power to the projector 70 from the power supply 90, with the current sensor detecting the current flow and providing current flow information to the controller 60. A leak detector 66 is provided in the projector housing and placed to detect leaks of the liquid coolant. The controller 60 can control the power switch 64 to interrupt power to the projector 70, e.g. in the case of abnormal temperature or current, or in the event of leak detection. The system 50 also includes a flow sensor 134 in the coolant return line whose output is connected to the controller 60.

Preferably, the projector 50 omits large items of magnetic material, such as transformer and ferrous material, and the housing; copper/AL/Brass type material, or aluminum or plastic is instead used, including for the housing. This is to prevent such magnetic material from being affected by the strong magnetic fields in and adjacent the MRI tube, and to prevent magnetic material from affecting the magnetic fields and the MRI images. There may exist relatively small masses of magnetic material within the projector module, but these should not affect the magnetic fields or the MRI images.

The remote cooling system 100 of an exemplary embodiment as in FIG. 1 includes:

(i) fluid pump 110;

(ii) flow sensor 118 for sensing fluid flow in the fluid return line 114;

(iii) power switch and current sensor 122;

(iv) cooling system controller 116;

(v) overcurrent protected medical power supply 120;

(vi) coolant flow line 112 and coolant return line 114; the lines may be flexible plastic tubing, typically ¼ diameter.

In addition, the cooling system 100 includes a non-magnetic cooling block 130 positioned in the projector 50 to conduct heat away from the heat producing components, the block including inlet and outlet ports 130A, 130B connected to the coolant lines 112, 114 which are connected to the pump and pump return. The cooling block 130 is non-magnetic, fabricated of aluminum or other non-magnetic material, and may include a cavity for the cooling liquid. Multiple coolant blocks can be provided to cool different heat generating components within the projector housing, and can be connected together with coolant line segments to be fed from the inlet line 112. The temperature sensor(s) 62 may include a separate temperature sensor for each coolant block.

The remote power supply 90 of an exemplary embodiment as in FIG. 1 includes:

(i) power switch and current sensor 92;

(ii) projector system power supply controller;

Overcurrent protected medical power supply 96;

Wiring 98.

The projector system 50 of an exemplary embodiment as in FIG. 1 includes:

(i) projector 70 with light sources;

(ii) cooling block 130 (as described above);

(iii) fiber optic to video signal converter 72 for converting fiber optic signals from the control room and converting the signals to video signals compatible with the projector 70;

(iv) temperature sensor 62; in the case in which separate cooling blocks are used for each of the red, green and blue light emitting sources, such as LED generators, and the controller circuit board, separate temperature sensors may be used to monitor temperatures at each cooling block;

(v) safety valve 132 in the input to the cooling block 130; this is preferably an MRI-compatible valve, with non-magnetic components.

(vi) flow sensor 134 for sensing flow of coolant liquid in return line;

(vii) liquid leak detector 66;

(viii) projector controller 60;

(ix) current sensor and power switch 64.

The system of FIG. 1 also includes three separated videos cameras 150A, 150B and 150C for capturing the scene in the magnet room or in the MRI tube, with a video signal to fiber optic converter 152 in the projector housing to send to the control room images captured by the videos cameras. The cameras are MRI-compatible devices, free of ferrous or other magnetic material.

It will also be appreciated that the projector system may provide a three dimensional (3D) viewing experience for the patient. The visible color tone spectrum may be divided into red, green and blue. Images for the left eye can be recorded in different parts of the red, green and blue spectrum from the corresponding red, green and blue spectrum used for the image. Both the left eye and the right eye images are projected simultaneously to the viewer/patient. Passive color 3D glasses are worn by the patient, and include respective left and right eye filters to filter out the respective image for each eye. This technique provides images that are bright, clear and flicker free.

Figure 2:
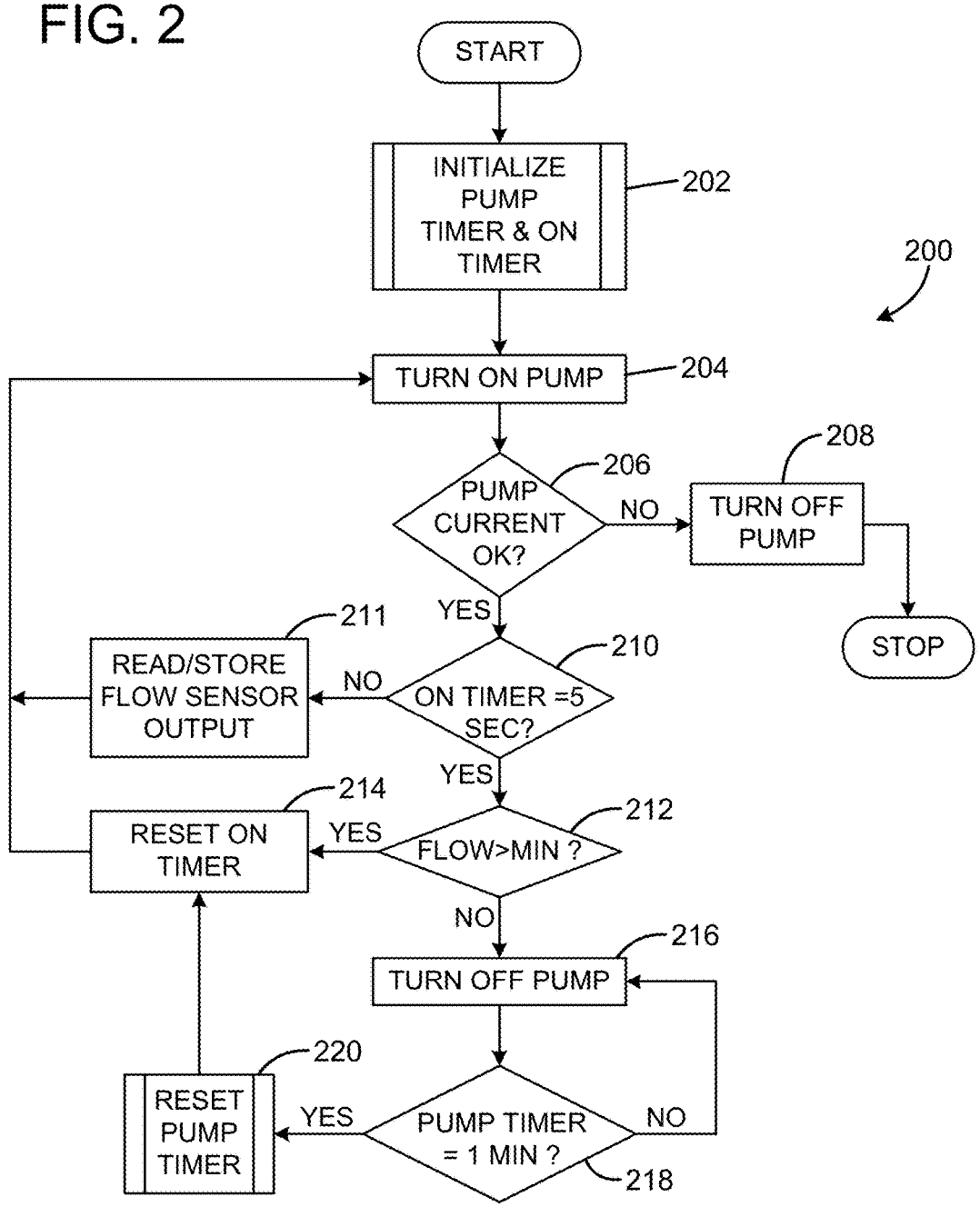
FIG. 2 is a diagrammatic flow diagram illustrating operation of the cooling system of FIG. 1.
Figure 3:
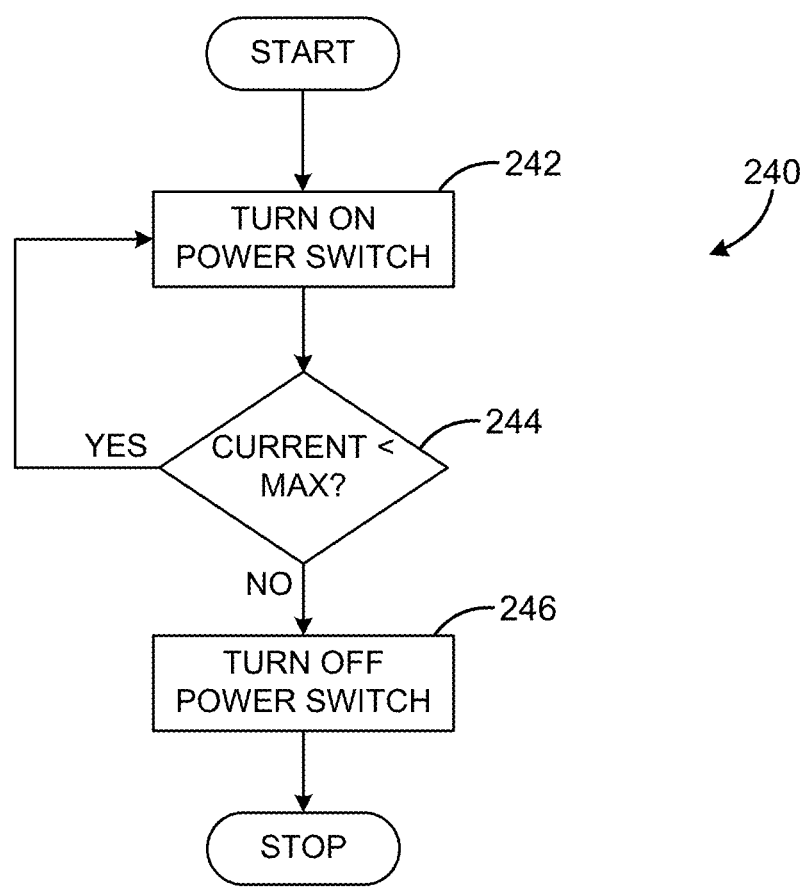
FIG. 3 is a diagrammatic flow diagram illustrating operation of the projector power supply of FIG. 1.
Figure 4:
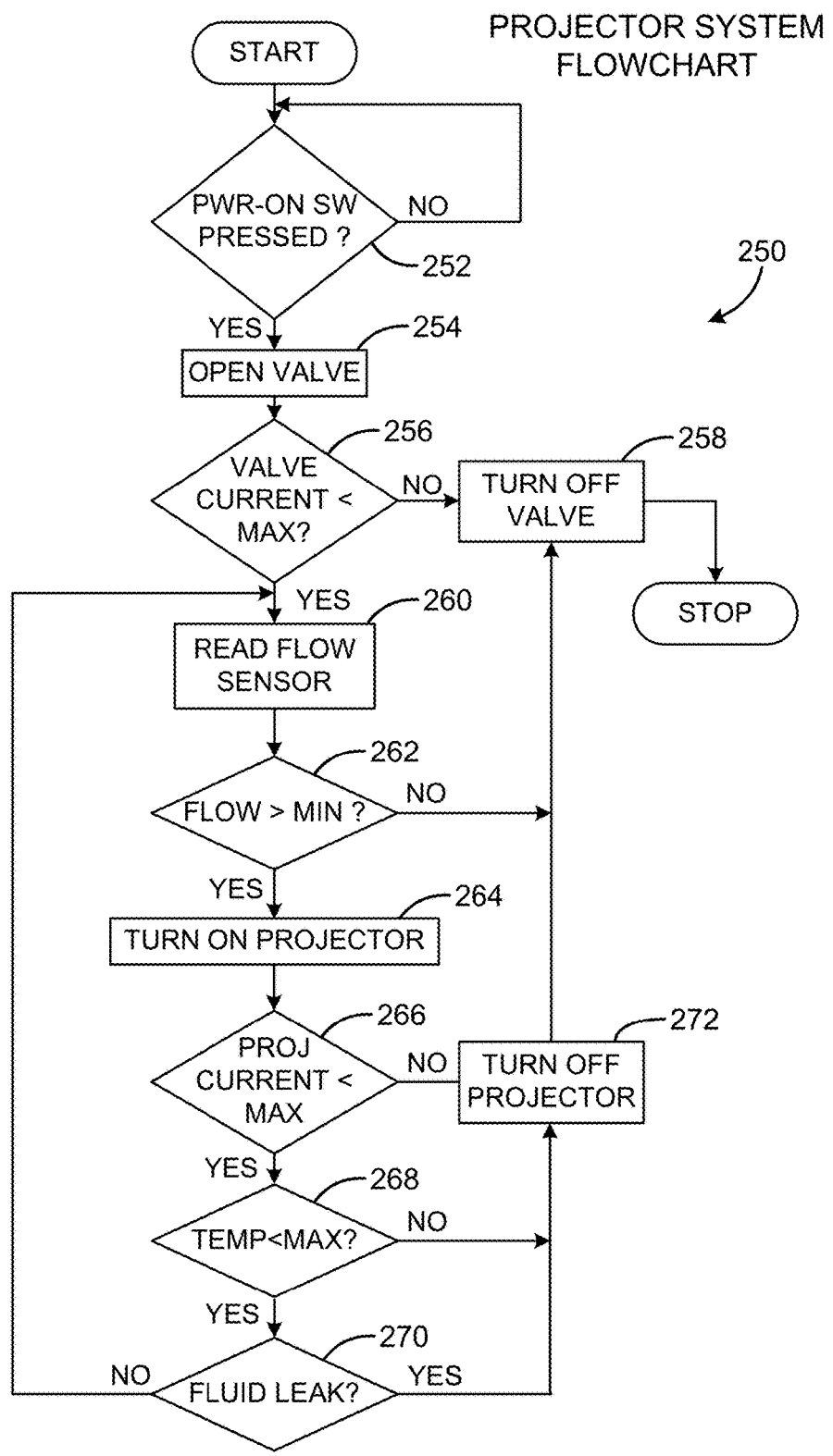
FIG. 4 is a diagrammatic flow diagram illustrating operation of the projector system of FIG. 1.

The flow diagrams of FIGS. 2, 3 and 4 describe the operations of the respective cooling system, power supply and projector system in detail.

FIG. 2 illustrates the operation of an exemplary embodiment of the cooling system 100. At 202, the pump timer and "on" timer (kept by the controller 116) is initialized. After the pump is turned on, a period of time elapses before the flow is stabilized. The "on" timer is used to make sure a sufficient time has elapsed. The pump 110 is turned on at 204. The pump current sensor is checked at 206, and if abnormal, the pump is turned off (208) and operation stops. Otherwise, the "on" timer is checked (210), and if five seconds has not elapsed, the output of the flow sensor 118 is read and stored (211), and operation returns to 204. Once five seconds has elapsed, the flow sensor is checked at 212, and if greater than the programmed threshold minimum flow, the "on" timer is reset, and operation returns to 204. If the flow is below the minimum, the pump is turned off (216). The pump timer is checked at 218, and operation returns to 216, until the pump timer reaches one minute, at which time the pump timer is reset (220), the "on" timer is reset (214), and operation returns to 204. Thus, in this exemplary embodiment, for each minute, the pump is turned on for five seconds, the flow is checked, and the pump turned off at the end of the five seconds if no flow is detected.

FIG. 3 shows a flow diagram 240 illustrating operation of an exemplary embodiment of the projector power supply 90. At 242, the power switch 92 is activated, and the current sensor 92 is checked (244). If the sensed current is below a threshold, operation continues (looping back to 242). If the current is greater that the threshold, the power switch is turned off at 246, and operation stops.

FIG. 4 shows a flow diagram 250 illustrating operation of an exemplary embodiment of the projector system 50. At 252, the projector power switch 64 is turned on, and valve 132 is turned on at 254. The condition of the valve current is checked at 256. In this embodiment, two different voltages V1 and V2 (5 V and 15 V) are supplied to current sensor and power switch 64. The component 64 provides, for each voltage line, a dedicated current sensor. When the valve 132 is turned on, a jump in the current is expected to be within a predefined range, a current reading outside of this range indicates a faulty valve. If the current exceeds a predetermined maximum threshold, the valve is turned off (258) and operation is stopped. If the valve current is below the threshold, the flow sensor 134 is read (260). If the flow does not exceed a minimum threshold, operation proceeds to 258 to turn off the valve and stop operation. If the flow exceeds the minimum threshold, the projector 70 is turned on at 264. If the current sensor 64 indicates the projector current exceeds a maximum threshold, the projector 70 is turned off (272), and operation proceeds to 258 to turn off the valve and stop operation. If the current is below the threshold (266), then the temperature sensor and fluid leak sensors are checked (268, 270), and if an abnormal condition is detected, operation proceeds to 272 to turn off the projector and the valve (258) and to stop operation. Otherwise, operation loops back to 260 to repeat the checks of the sensors and continue projector operation.

Figure 5:
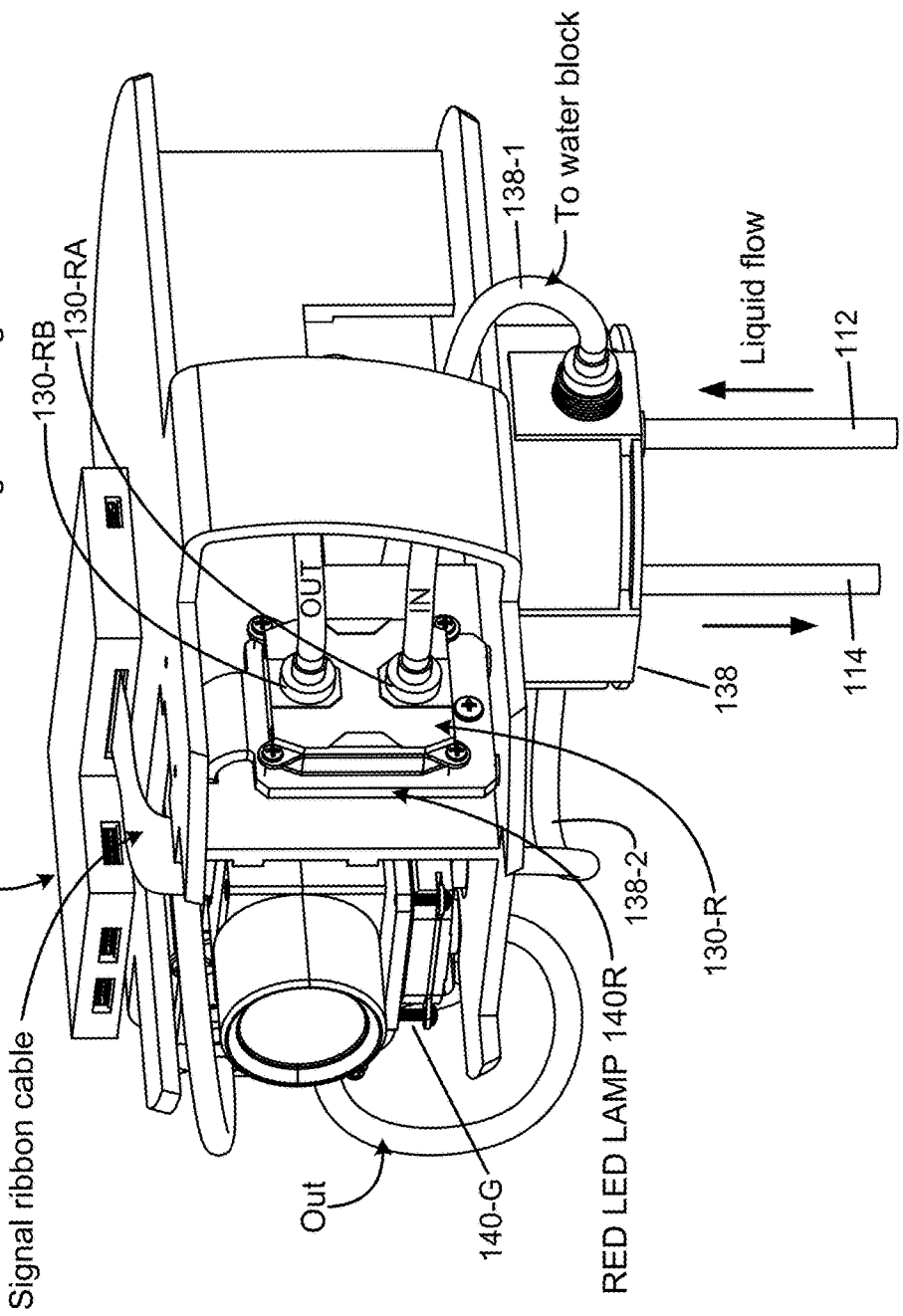
FIG. 5 is an isometric diagram illustrating features of the projector of FIG. 1, showing exemplary routing of liquid flow lines on the projector.
Figure 6:
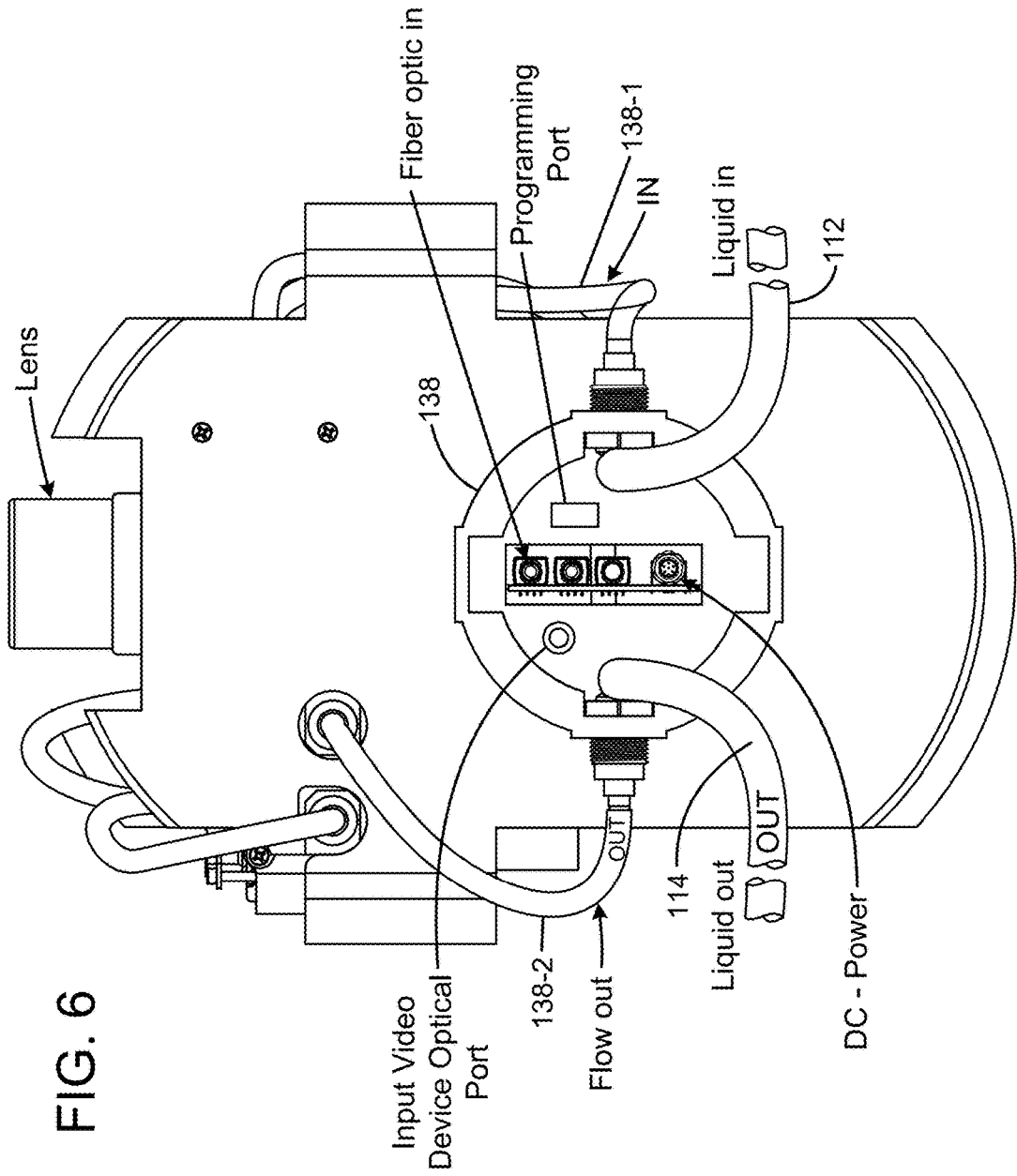
FIG. 6 is a bottom view of the projector of FIG. 5, showing additional details of the routing of liquid flow lines for the cooling system.

FIGS. 5 and 6 illustrate exemplary routing of the cooling lines to and from the coolant block structure in an exemplary projector 50. In this exemplary embodiment, there are separate cooling blocks for each of the red, green and blue LED lamps, and one for the display/controller circuitry 142. The cooling blocks can be daisy-chained together, and fed from a manifold structure 138, which can also house the valve 132 and flow sensor 134. The red lamp 140-R is depicted in FIG. 5; with the fluid "in" port 130-RA of the red coolant block 130-R fed by line 138-1, and the fluid "out" port 130-RB leading to the green lamp coolant block 140-G, and the output from the green LED coolant block leading to the blue lamp cooling block (not visible in FIG. 5) input. The output from the blue lamp coolant block is then fed to the input to the circuitry coolant block, and its output back to the manifold 138 on line 138-2. Separate temperature sensors are used for each coolant block to monitor the temperature at each block; the temperature sensor signals are provided to the projector controller FIG. 6 is a diagrammatic bottom view of the projector system, illustrating the coolant lines, the manifold 138, and some of the connectors.

FIGS. 7-12 illustrate features of another embodiment of a projector system with fluid cooling. In this embodiment, there is an optical link 102 between the projector power supply module 90' and the cooling module 100'. The controller 116 of the cooling module is responsive to the optical signals from the power supply module 90, in the manner described in the flow diagrams, FIGS. 8-10. The use of an optical link facilitates use in the magnet room, avoiding the need for electrical communication between the power supply 90' and the coolant module 100'.

Figure 8:
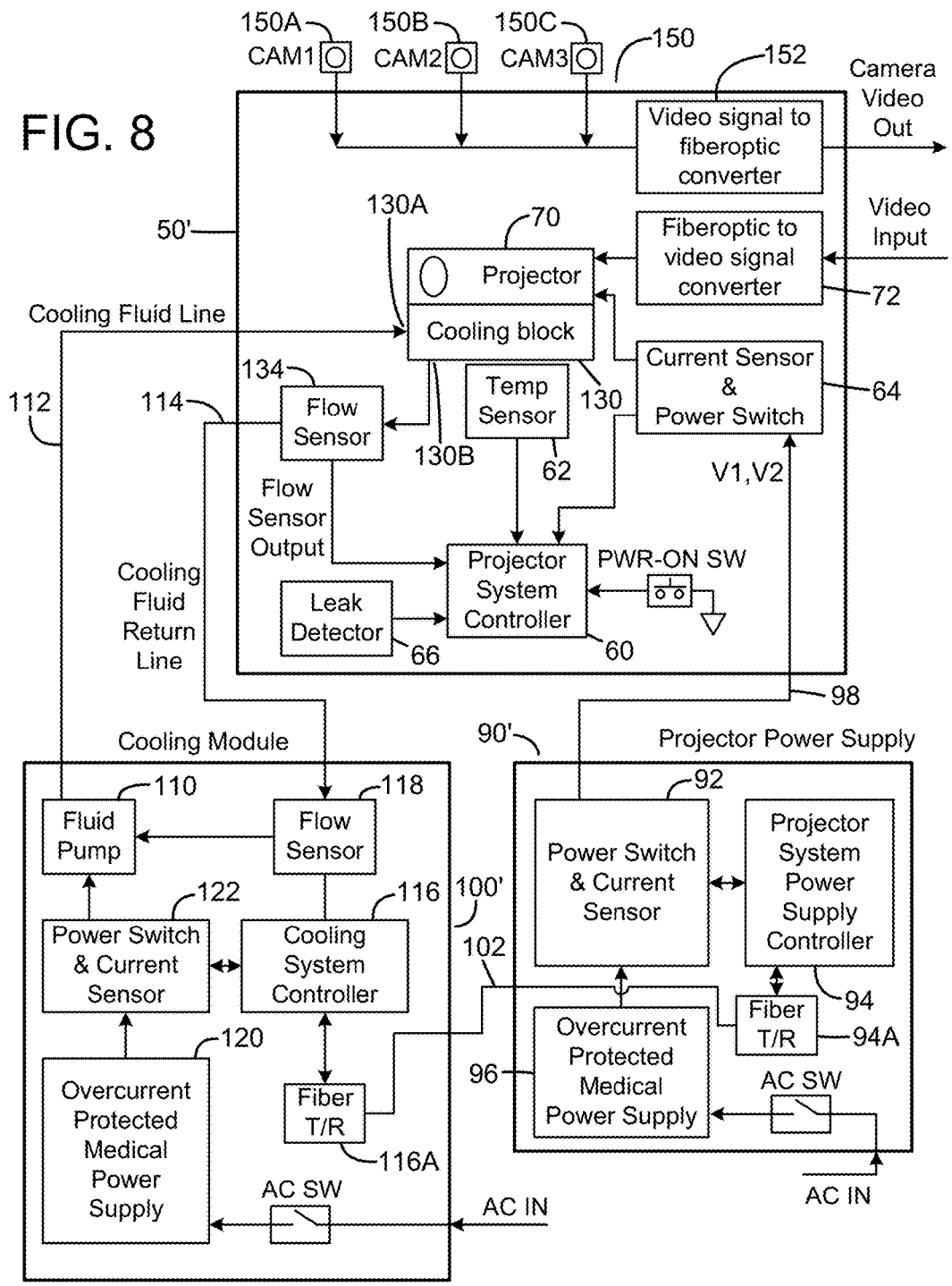
FIG. 8 is a detailed schematic diagram of the projector system embodiment of FIG. 7.

FIG. 8 is a schematic diagram illustrating features of the projector module 50', the cooling module 100' and the power supply module 90'. The projector module 50' in this exemplary embodiment omits the coolant valve 132 of the embodiment illustrated in FIG. 1, and corresponding valve control signal generated by the controller 60. This omission facilitates use of the projector in very high Tesla MRI installations. The power supply module 90' includes a fiber optic transmit/receive module 94A, which is responsive to signals from the controller 94 to generate optical commands for transmission through the optical fiber link 102 to the cooling module 100'. The cooling module 100' in turn includes a fiber optic transmit/receive module 116A, which is connected to the optical fiber link 102. The module 116 is coupled to the cooling system controller 116, to provide command signals received from the power supply module 90' to the controller 116.

Figure 7:
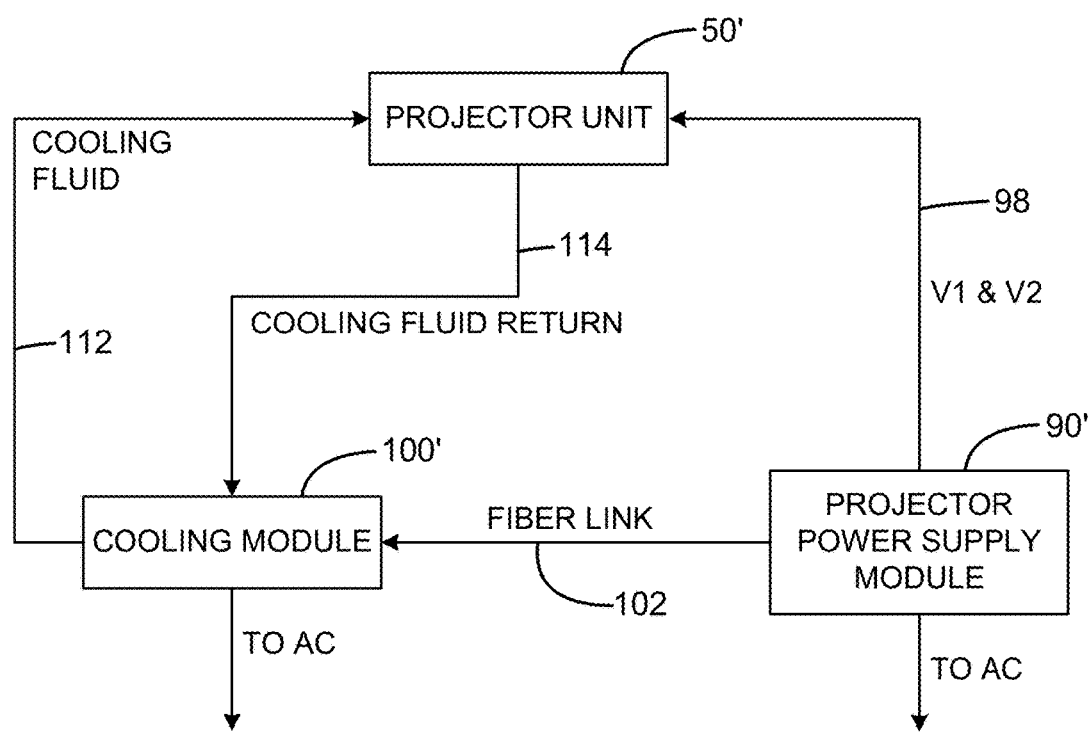
FIG. 7 is a simplified schematic diagram illustrating features of another exemplary embodiment of a projector system.
Figure 9:
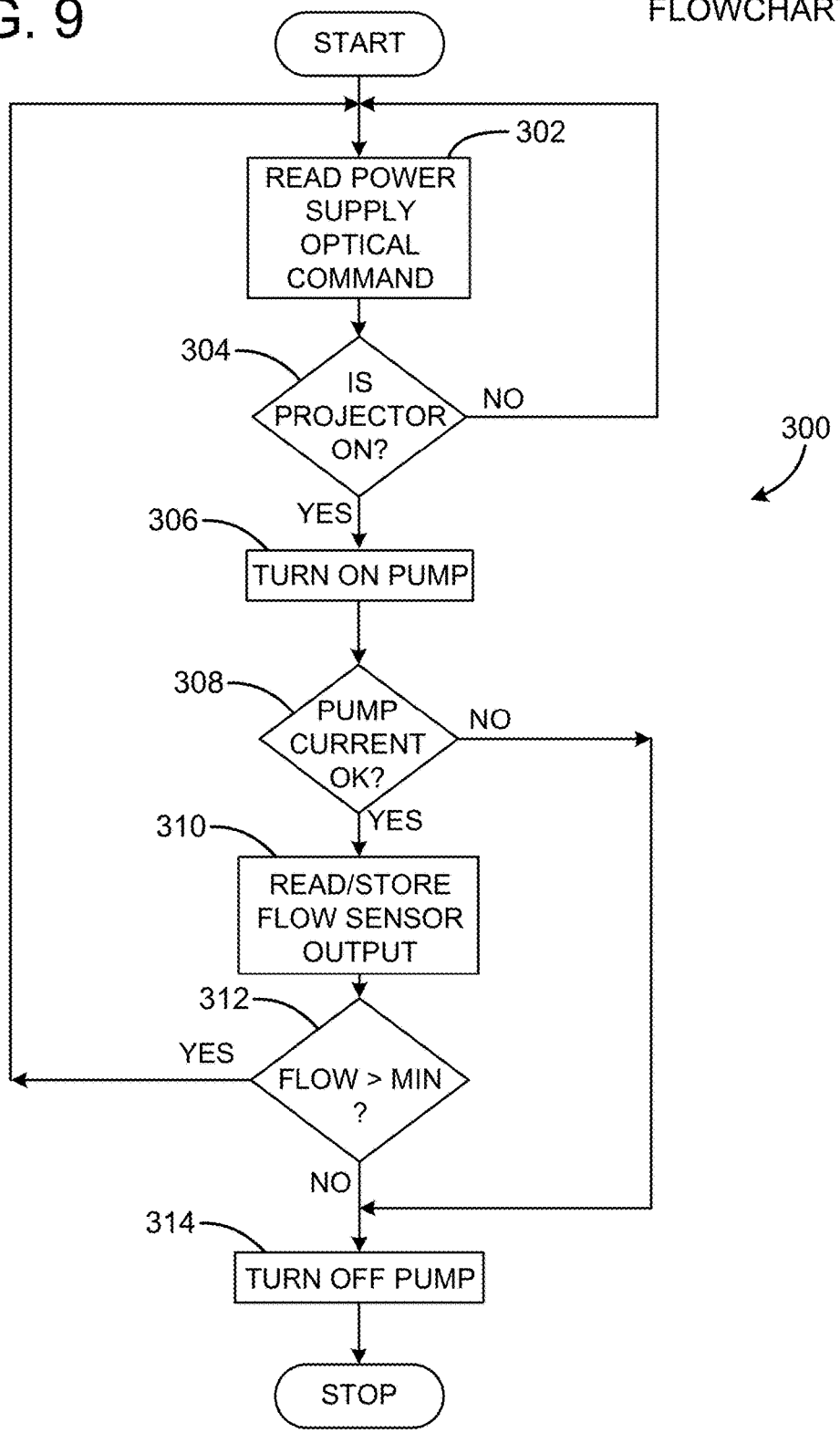
FIG. 9 is a diagrammatic flow diagram illustrating operation of the cooling system of the embodiment of FIG. 7.

FIG. 9 illustrates the cooling system (100) operation in the alternate embodiment of FIG. 7. At 302, the controller 116 reads the optical commands received over the optical link 102 from the power supply module 90', to determine whether the projector is turned on. if the projector is not on at 304, the operation returns to 302. If the power supply module is turned on, the coolant pump 110 is turned on, and the pump current checked (using the output from the power switch and current sensor 122) at 308. If the pump current is abnormal, the pump is turned off (314) and operation stops. One the pump has stopped, the stoppage of the fluid flow is detector in the projector module, and will cause the projector controller to turn off the projector. If the pump current is in a normal range at 308, the flow sensor (118) output is read and stored, and if the flow is within a normal range, operation branches back to 302. Otherwise, if the flow is not within the normal range, operation proceeds to 314 to turn off the pump and stop operation.

Figure 10:
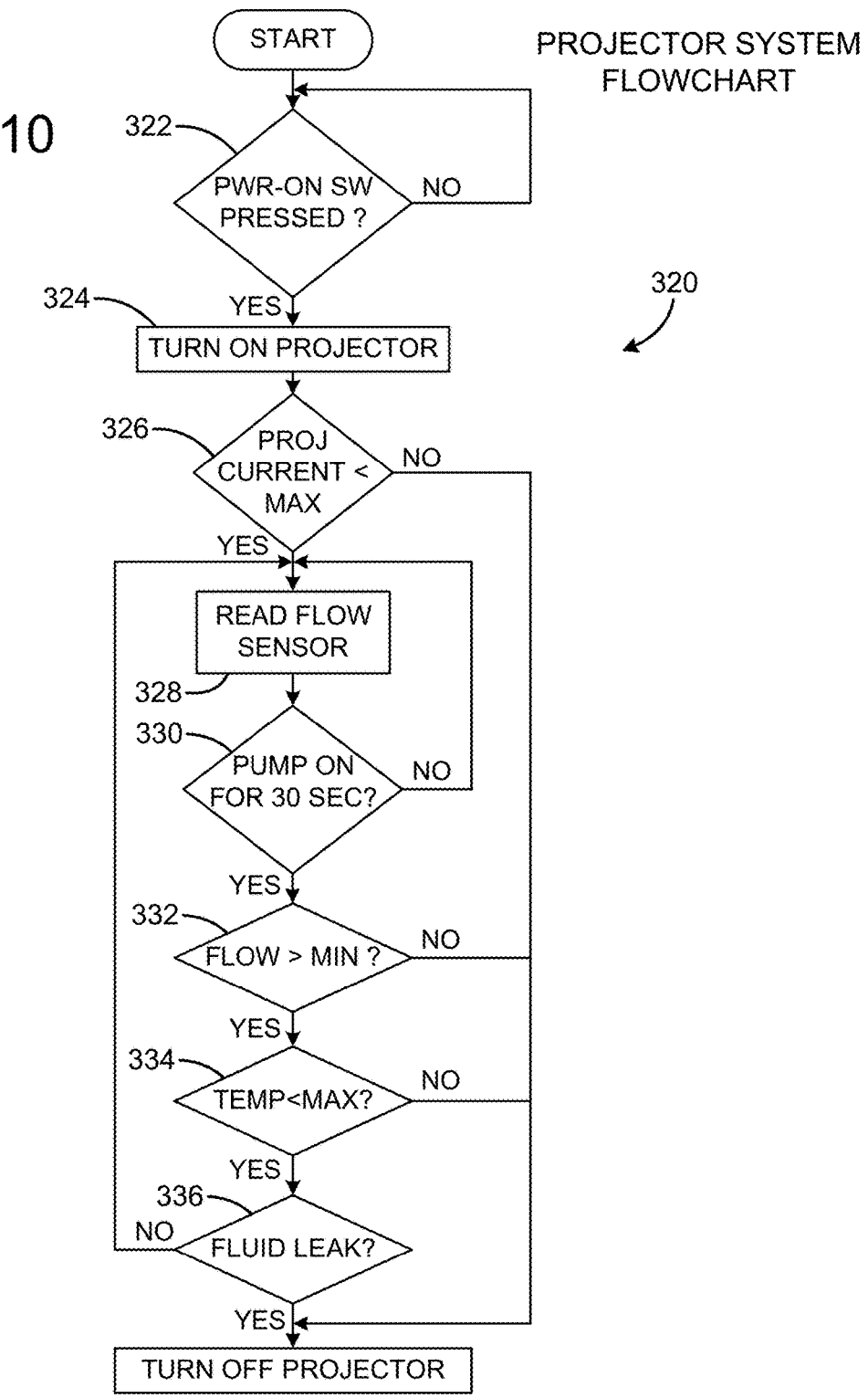
FIG. 10 is a diagrammatic flow diagram illustrating operation of the projector system embodiment of FIG. 7.

FIG. 10 illustrates operation 320 of an exemplary embodiment of the projector module 50' in the embodiment of FIG. 7. At 322, the state of the power on switch in the projector is checked, and if not turned on, operation returns to 322 to continue checking until the switch is turned on. At that point, the projector is turned on (324), and the projector current draw is sensed at 326. If the current draw exceeds a maximum threshold, the projector module is turned off. If the current is below the threshold, the flow sensor 134 is read at 328. A timer is checked to determine whether flow has been sensed (indicating that the fluid pump 110 has been turned on) for at least 30 seconds at 326. If not, operation loops back to 328, until the coolant flow has been sensed for 30 seconds. The operation of the projector module continues, so long as the temperature reading from sensor 62 is below a threshold and no fluid leak is sensed by detector 66. The projector module is turned off if the flow is below the threshold, or the temperature exceeds a predetermined threshold, or if a fluid leak is detected.

Figure 11:
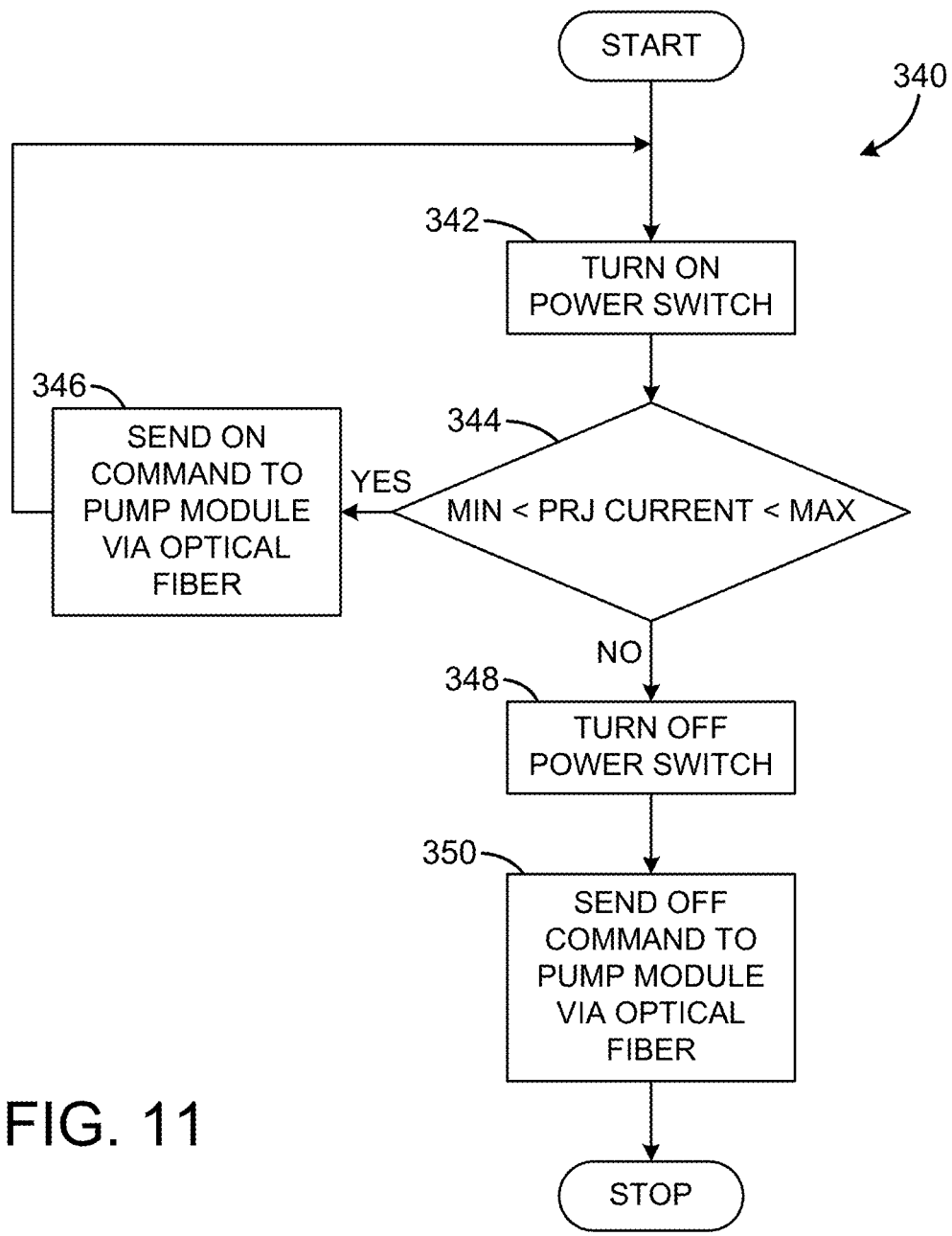
FIG. 11 is a diagrammatic flow diagram illustrating operation of the projector system power supply of the embodiment of FIG. 7.

FIG. 11 illustrates an operational process 340 of an exemplary projector power supply 90' in the embodiment of FIG. 7. At 342, the AC power switch in system 90' is turned on by the user. At 344, the current sensor/power switch 92 is checked to determine whether the projector current is within minimum and maximum current thresholds. If not, the power switch 92 is turned off, an off command is sent to the controller 116' via the optical link 102, and operation is stopped. If the current is within the thresholds, the controller 94 sends an "on" command to the pump module controller 116 via the optical fiber link.

Figure 12:
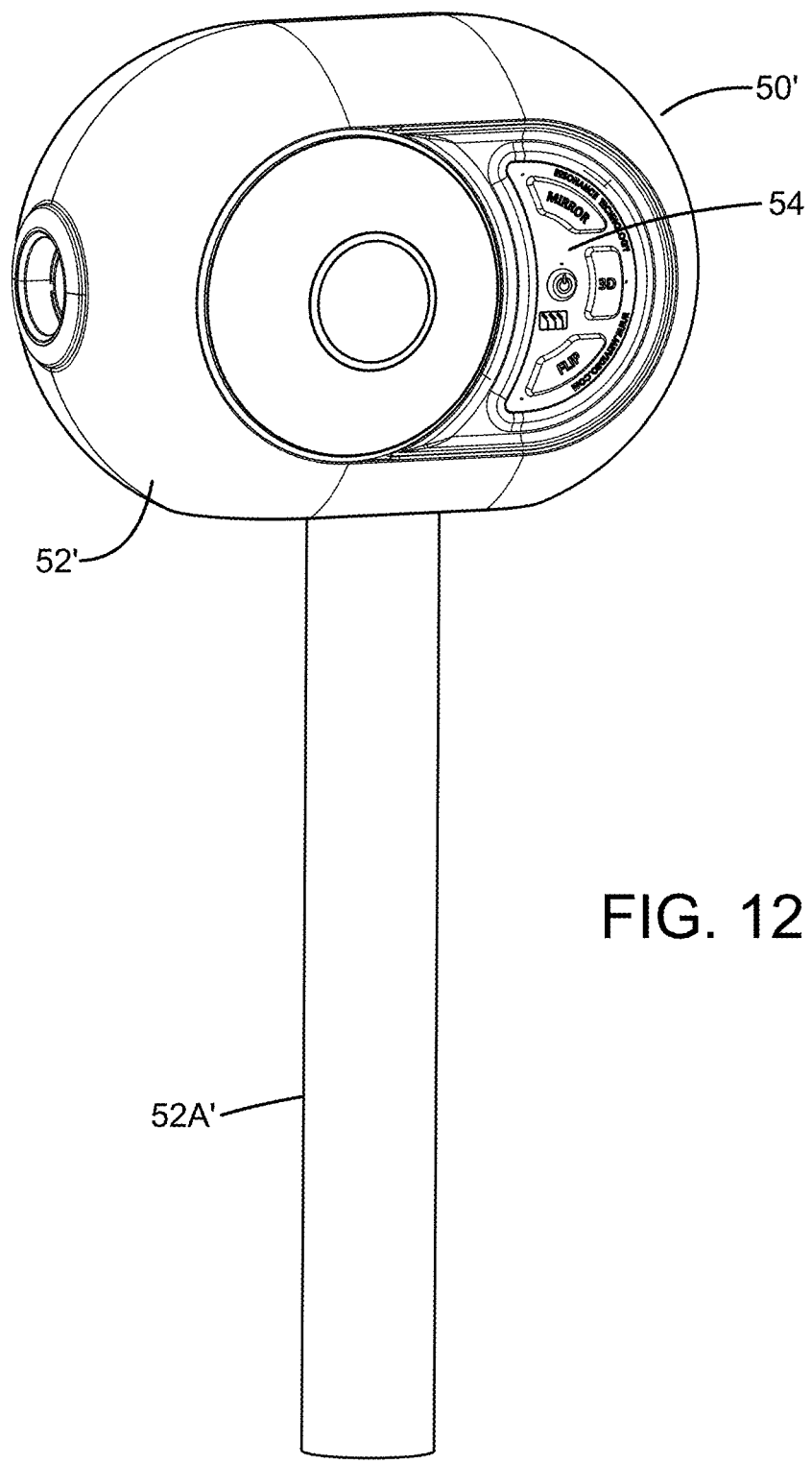
FIG. 12 is an isometric of the projector module of the embodiment of FIG. 7, showing an exemplary housing structure.

FIG. 12 illustrates an exemplary embodiment of the projector module 50', in which the elements of FIG. 7 are contained in housing 52', which is in turn mounted to a post structure 52', at a location in the magnet room in which the projector light emitted by the projector module is directed to impinge on the patient's eyes. The module housing mounts a control panel 54, which controls that may be actuated by the operator. These can include features such as instructing the projector module controller to operate in 3D mode, to flip the image 180 degrees, or to generate the image in a mirror image mode.

Although the foregoing has been a description and illustration of specific embodiments of the subject matter, various modifications and changes thereto can be made by persons skilled in the art without departing from the scope and spirit of the invention.

What is claimed is:

1. An MRI-compatible video projector system with one or more safety features, comprising:
   an MRI-compatible projector module including a housing, a projector controller and light generating components, the projector module free of large items of magnetic material so that the projector module does not impact the MRI imaging process;
   a fluid coolant system, comprising at least one coolant block of non-magnetic material disposed in or adjacent the projector housing and heat generating projector components, and a cooling module situated remotely from the projector module;
   the cooling module including a coolant pump coupled to the coolant block by coolant lines carrying coolant to and from the coolant block in a coolant flow path, the cooling module including a coolant controller for controlling operation of the pump and a coolant system flow sensor for detecting fluid flow in a coolant line and providing a coolant system flow signal to the coolant controller;
   wherein the cooling module is not electrically coupled to the projector module;
   a projector electrical power module situated remotely from the projector for providing electrical power to the projector module through a wiring link; and
   wherein said one or more safety features includes:
   (i) a flow sensor in the projector module and coupled in the coolant flow path and having a flow sensor signal coupled to the projector controller, the controller responsive to the flow sensor signal to disable operation of the light generating components in the event of lack of adequate coolant flow;
   (ii) a coolant leak sensor mounted in the projector housing and responsive to leaking coolant to provide a leak detection signal to the projector controller, the controller responsive to the leak detection signal to disable operation of the light generating components; and
   (iii) a temperature sensor mounted in the projector housing and responsive to temperatures in the housing to provide a temperature signal to the projector controller, the projector controller responsive to the temperature signals to disable operation of the light generating components if the temperature exceeds a threshold temperature.

2. The system of claim 1, further including a current sensor for sensing magnitudes of a current drawn by the projector and disabling operation of the system in the event an abnormally large current draw is sensed.

3. The system of claim 1, wherein the projector module further includes a coolant flow valve controlled by the projector controller and disposed in the coolant flow path to turn off and prevent flow of coolant or turn on and allow the flow of coolant, and wherein the coolant controller is configured to operate the pump in a "stand by" off condition, with periodic pump "turn on" and detection of coolant flow, and is further configured to continue to pump coolant through the coolant flow path if coolant flow is detected.

4. The system of claim 1, further comprising a fiber optic link connected between the projector power module and the cooling module for delivering optical power module signals indicating the projector power module is turned on.

5. The system of claim 4, wherein the cooling system controller is responsive to said power module signals to turn on the pump and is responsive to the coolant system flow signal to turn off the pump if the coolant flow is not greater than a minimum threshold.

6. The system of claim 1, wherein the at least one coolant block comprises a plurality of coolant blocks, one for each light generating component and one for the projector controller.

7. The system of claim 6, wherein the at least one temperature sensor comprises a plurality of temperature sensors, one for each of said plurality of coolant blocks.

8. The system of claim 7, wherein the light generating components comprise a red LED lamp, a blue LED lamp and a green LED lamp.

9. The system of claim 1, wherein the projector system is configured for use in an MRI installation including a control room and a magnet room in which an MRI tube is installed, the system further comprising one or more MRI-compatible video cameras mounted to the projector housing for capturing the scene in the magnet room or in the MRI tube.

10. The system of claim 9, further comprising a video signal to fiber optic converter in the projector housing configured to send to the MRI control room images captured by the one or more MRI video cameras.

11. An MRI-compatible video projector system, comprising:
   An MRI-compatible projector module including a housing, a projector controller and light generating components, the projector module configured to be mounted adjacent an MRI bore;
   a fluid coolant system, comprising at least one coolant block of non-magnetic material disposed in or adjacent the projector housing and heat generating projector components, and a cooling module situated remotely from the projector module;
   the cooling module including a coolant pump coupled to the at least one coolant block by coolant lines carrying coolant to and from the coolant block in a coolant flow path, the cooling module including a coolant controller for controlling operation of the pump and a coolant system flow sensor for detecting fluid flow in a coolant line and providing a coolant system flow signal to the coolant controller;
   a projector electrical power module situated remotely from the projector;
   a projector flow sensor mounted in the projector module and coupled in the coolant flow path and having a flow sensor signal coupled to the projector controller, the projector controller responsive to the flow sensor signal to disable operation of the light generating components in the event of lack of adequate coolant flow;
   at least one temperature sensor mounted at the projector module and providing a temperature signal indicative of a temperature in the projector module to the projector controller, the controller responsive to the temperature signal to disable operation of the light generating components in the event the temperature exceeds a threshold; and
   a coolant leak sensor mounted in the projector housing and responsive to leaking coolant to provide a leak detection signal to the projector controller, the projector controller responsive to the leak detection signal to disable operation of the light generating components.

12. The system of claim 11, wherein the projector module further includes a coolant flow valve controlled by the projector controller and disposed in the coolant flow path to turn off and prevent flow of coolant or turn on and allow the flow of coolant, and wherein the coolant controller is configured to operate the pump in a "stand by" off condition, with periodic pump "turn on" and detection of coolant flow, and is further configured to continue to pump coolant through the coolant flow path if coolant flow is detected.

13. The system of claim 11, wherein the coolant module is not electrically coupled to the projector module.

14. The system of claim 11, further comprising a fiber optic link connected between the projector power module and the cooling module for delivering optical power module signals to the cooling module indicating the projector power module is turned on.

15. The system of claim 14, wherein the cooling system controller is responsive to said power module signals to turn on the pump and is responsive to the coolant flow sensor to turn off the pump if the coolant flow is not greater than a minimum threshold.

16. The system of claim 11, wherein the at least one coolant block comprises a plurality of coolant blocks, one for each light generating component and one for the projector controller.

17. The system of claim 16, wherein the at least one temperature sensor comprises a plurality of temperature sensors, one for each of said plurality of coolant blocks.

18. The system of claim 16, wherein the coolant blocks are daisy-chained together.

19. The system of claim 16, wherein the light generating components comprise a red LED lamp, a blue LED lamp and a green LED lamp.

20. The system of claim 11, further comprising a post structure, the projector module mounted to the post structure, which is configured for mounting in the magnet room at a location in which projector light emitted by the projector module is directed to impinge on the patient's eyes.

* * * * *